(12) United States Patent
Lenherr (10) Patent No.: US 8,006,825 B2
(45) Date of Patent: Aug. 30, 2011

(54) TRANSFERRING DEVICE FOR REPOSITIONING ARTICLES

(75) Inventor: Harald Lenherr, Beringen (CH)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 12/441,865

(22) PCT Filed: Oct. 20, 2006

(86) PCT No.: PCT/EP2006/067616
§ 371 (c)(1),
(2), (4) Date: Oct. 8, 2009

(87) PCT Pub. No.: WO2007/054426
PCT Pub. Date: May 18, 2007

(65) Prior Publication Data
US 2010/0096241 A1   Apr. 22, 2010

(30) Foreign Application Priority Data
Nov. 10, 2005   (DE) .......................... 10 2005 054 005

(51) Int. Cl.
*B65G 29/00* (2006.01)
(52) U.S. Cl. ............... 198/377.07; 198/377.1; 198/474.1
(58) Field of Classification Search .. 198/377.01–377.1, 198/474.4, 475.1, 459.8, 459.2
See application file for complete search history.

(56) References Cited

U.S. PATENT DOCUMENTS

| 3,952,865 | A | * | 4/1976 | Rudszinat et al. ....... 198/377.04 |
| 4,394,898 | A | * | 7/1983 | Campbell ..................... 198/374 |
| 4,408,435 | A | * | 10/1983 | Sutton ............................... 53/225 |
| 4,558,778 | A | | 12/1985 | Cristiani |
| 5,647,190 | A | * | 7/1997 | Minarelli et al. ............... 53/446 |
| 5,690,125 | A | * | 11/1997 | Niemann et al. .............. 131/281 |
| 5,871,079 | A | * | 2/1999 | Nannini et al. .......... 198/377.04 |
| 5,975,278 | A | * | 11/1999 | Ruth ......................... 198/377.01 |
| 6,092,642 | A | * | 7/2000 | Boldrini ..................... 198/418.2 |
| 6,273,242 | B1 | * | 8/2001 | Olson et al. .................... 198/797 |
| 7,093,705 | B2 | * | 8/2006 | Ohiro et al. .............. 198/377.08 |
| 2003/0010603 | A1 | * | 1/2003 | Corrigan ..................... 198/474.1 |
| 2005/0061620 | A1 | * | 3/2005 | Bonnain et al. ............ 198/459.8 |

FOREIGN PATENT DOCUMENTS

| DE | 25 51 538 | 5/1977 |
| DE | 696 14 959 | 4/2002 |

* cited by examiner

*Primary Examiner* — Mark A Deuble
(74) *Attorney, Agent, or Firm* — Michael J. Striker (57) ABSTRACT

A transfer arrangement (10) for gripping articles (at 60) comprises a central wheel body with a multiplicity of arms (20), which can be pivoted about a first axis (23) in each case, articulated along its periphery. The arms (20) have a gripper (60) for receiving in each case one or more articles (15). Each gripper (60) can be rotated about a second axis (33) for predetermined positioning of the articles, while the connecting body (30) can be rotated about the first axis (23). The rotary movement of the gripper (60), then, can be transferred to the gripper (60), rotating about the second axis (33), via a shaft (28) arranged along the first axis (23), with the aid of a transfer element (25, 26, 27). Finally, a third axis (43) is arranged on the connecting body (30), between the first and second axes (23, 33). This allows rotation of the connecting body (30) to be transferred in a controlled manner to the connecting body (30), at the location of the first axis (33), via a shaft (49) arranged along the third axis (43), with the aid of a transfer element (45, 46, 47). This means that articles (15) can be tracked.

17 Claims, 8 Drawing Sheets

TRANSFERRING DEVICE FOR REPOSITIONING ARTICLES

CROSS-REFERENCE TO A RELATED APPLICATION

The invention described and claimed hereinbelow is also described in German Patent Application DE 10 2005 054 005.8 filed on Nov. 10, 2005. This German Patent Application, whose subject matter is incorporated here by reference, provide the basis for a claim of priority of invention under 35 U.S.C. 119(a)-(d).

BACKGROUND OF THE INVENTION

Related Art

The present invention relates to a transfer device for gripping articles from a first supply conveyor, which points in a first direction, and then placing the articles on a second, removing conveyor, which points in a second direction, it being possible, in particular, for the first and second directions to be at right angles to each other.

A number of devices of this type have been known from the related art for a long time. For example, publication DE 25 51 538 disclosed a device of this type, as described in the preamble of Claim 1. The transfer device described therein is designed to lift easily deformable packaging articles from a first conveyor, and to deposit them, with the same orientation, onto a second conveyor. A revolving system of suction carriages is used for this purpose, with which the suction devices that grip the packaging articles are rotatable by 90 degrees, so that the orientation of the packaging articles remains the same. The related art is designed to convey soap pieces. These pieces have relatively similar dimensions in terms of width and length in the plane of the conveyors.

The device in the related art is less suitable for transporting longitudinal or extremely long articles. "Longitudinal articles" are understood to be elements to be transported that have a ratio of longitudinal dimension to transverse dimension of at least 4:1 or more, and, in particular, of 10:1 and more.

SUMMARY OF THE INVENTION

Based on the related art, the object of the present invention is to provide a transfer device for gripping longitudinal articles that may easily compensate for the great difference in speed between a slow supply conveyor and the subsequent removing conveyor.

When supplying longitudinal articles that are essentially transported transversely and that have a width of, e.g., 19 millimeters and a length of 152 millimeters, and which are transported 19 millimeters apart on the supply conveyor and 38 millimeters apart on the removing conveyor, the speed ratio between the two conveyors is 38 to 190, i.e., 1:5.

The inventive transfer device includes a wheel with movable arms that perform a tracking swivel motion of the connecting body to pick up, rotate, and deposit the products in a positioned manner.

A transfer device for gripping articles is preferably composed of a central wheel body, on the periphery of which a large number of arms is hingedly connected, the arms being swivelable around a first axis. The arms includes a gripper for picking up one article or several articles. Each gripper is rotatable around a second axis for a specified orientation of the articles, while the connecting body is rotatable around the first axis. The rotational motion of the gripper is transferrable via a shaft located in the first axis with the aid of a transfer element to a gripper that rotates around the second axis.

In a first embodiment, a third axis is located between the first and second axis on the connecting body. This makes it possible for the connecting body to perform a controlled rotation via a shaft located in the third axis with the aid of a transfer element on the connecting body at the location of the first axis. This makes it possible to track articles.

Longitudinal articles that are supplied in a transverse position may therefore be reoriented into a longitudinal orientation, e.g., for loading a horizontal tubular-bag machine. A high rate of throughput is attainable, e.g., 600 products per minute, and a removal speed of 100 meters per minute is possible, because the great change in speed—which results from reorienting the longitudinal articles from "transverse" to "longitudinal" for an "in-line positioning" for a horizontal tubular-bag machine—is bridged by the tracking arms.

A device of this type is excellently suited for transferring longitudinal articles of this type.

Rotating by 90 degrees and depositing is often selected for practical reasons, but it is not absolutely necessary. Angles of, e.g., 60 or 120 degrees may also be selected, or angles between these values may be selected.

Exemplary embodiments of the present invention are shown in the figures.

DESCRIPTION OF THE PREFERRED EMBODIMENTS

Figure 1:
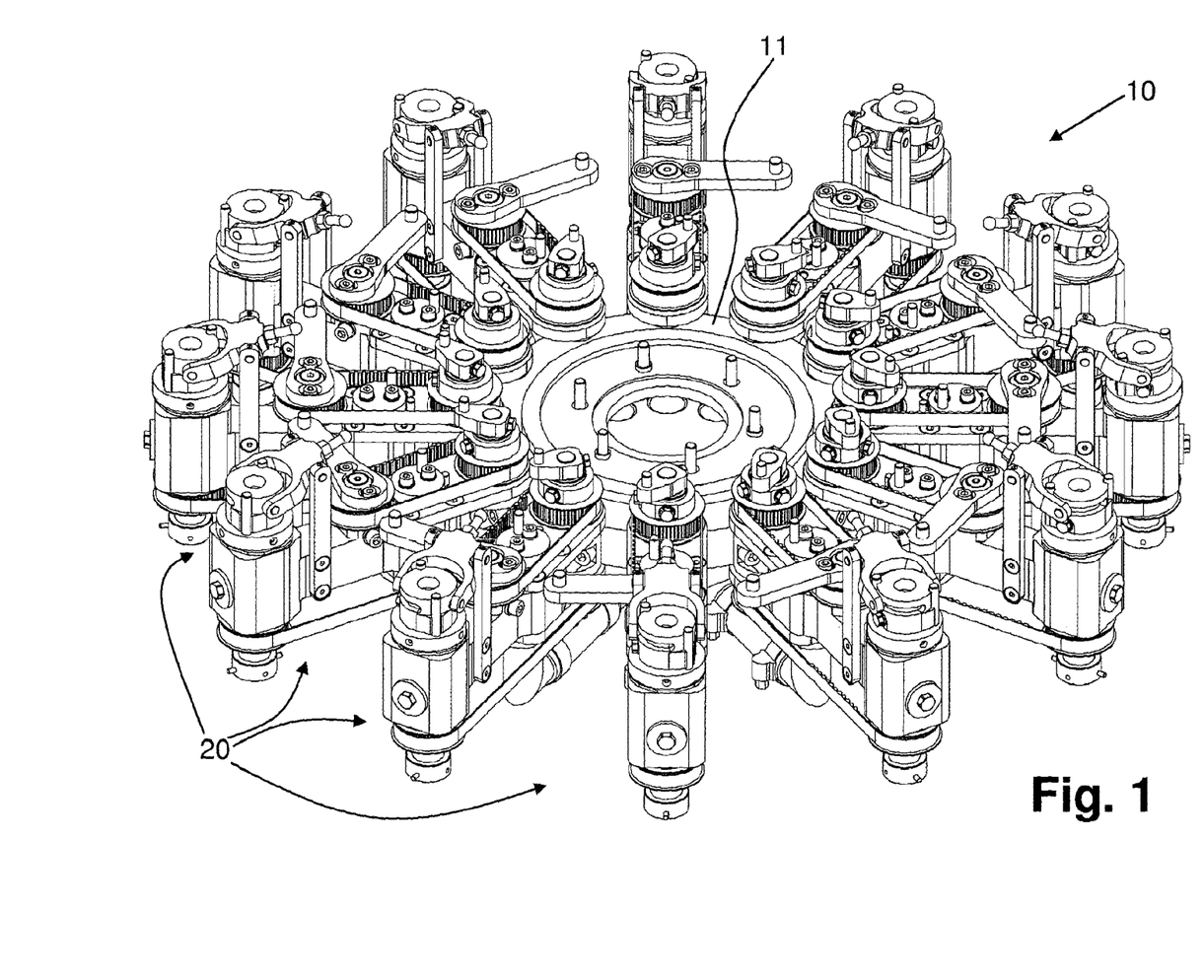
FIG. 1 shows a perspective view of the transfer device with twelve arms according to a first exemplary embodiment of the present invention.

FIG. 1 shows a perspective view of transfer device 10 with twelve arms 20 according to a first exemplary embodiment of the present invention. Twelve arms 20 are movable in their horizontal plane, and they are hingedly connected to central wheel 11. Wheel 11 is rotatable around its axis, which is vertical in this case. The rotational speed may be variable, although it is advantageously constant.

Figure 2:
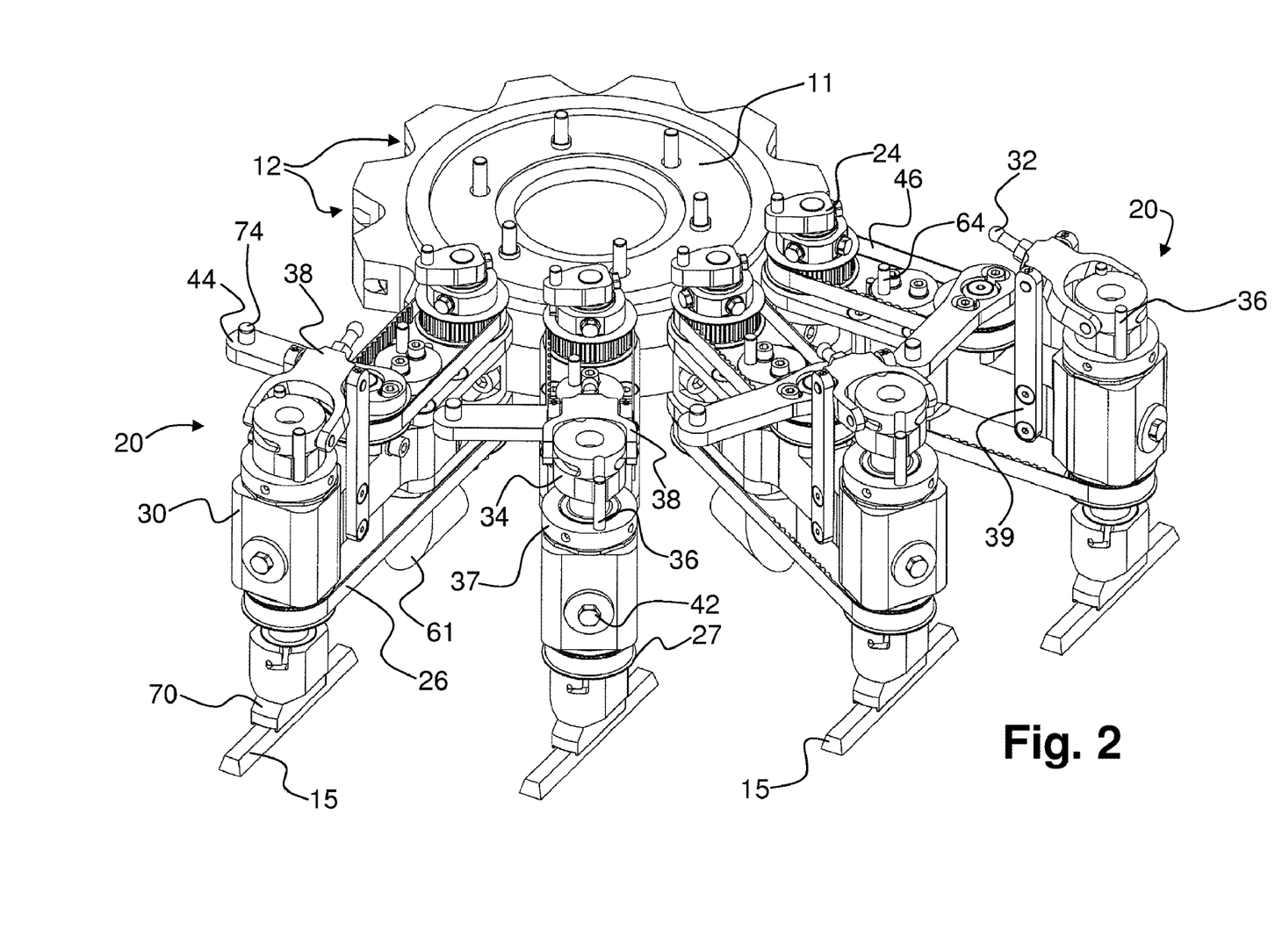
FIG. 2 shows a perspective view of the transfer device in FIG. 1, in an enlarged view, which shows the four arms in greater detail.

Articles 15 shown in FIG. 2 have been ordered. In this context, an "ordered" arrangement means that the longitudinal articles are located transversely to the transport direction of the supply conveyor. Transport device 10 is capable of depositing the articles—fully oriented in their longitudinal direction—onto the removing conveyor, one after the other. Further details of arms 20 of first exemplary embodiment are described in conjunction with FIGS. 2 through 4. The features that are the same in all figures are labelled with the same reference numerals.

FIG. 2 shows a perspective view of transfer device 10 in FIG. 1, in an enlarged view, which shows the four arms in greater detail. In particular, receptacles 12 for arms 20 are shown on wheel 11. Arms 20 are screwed tightly into receptacles 12. All of the rotational and displacement motions are controlled by drives and axles inside arms 20.

This is explained with reference to FIG. 3, which shows an exploded view of a single arm 20 according to FIG. 1. Reference is also made to FIG. 4, which shows a cross-sectional view of arm 20 of transfer device 10 in FIG. 1. Advantageously, all of the arms have the identical design.

Figure 3:
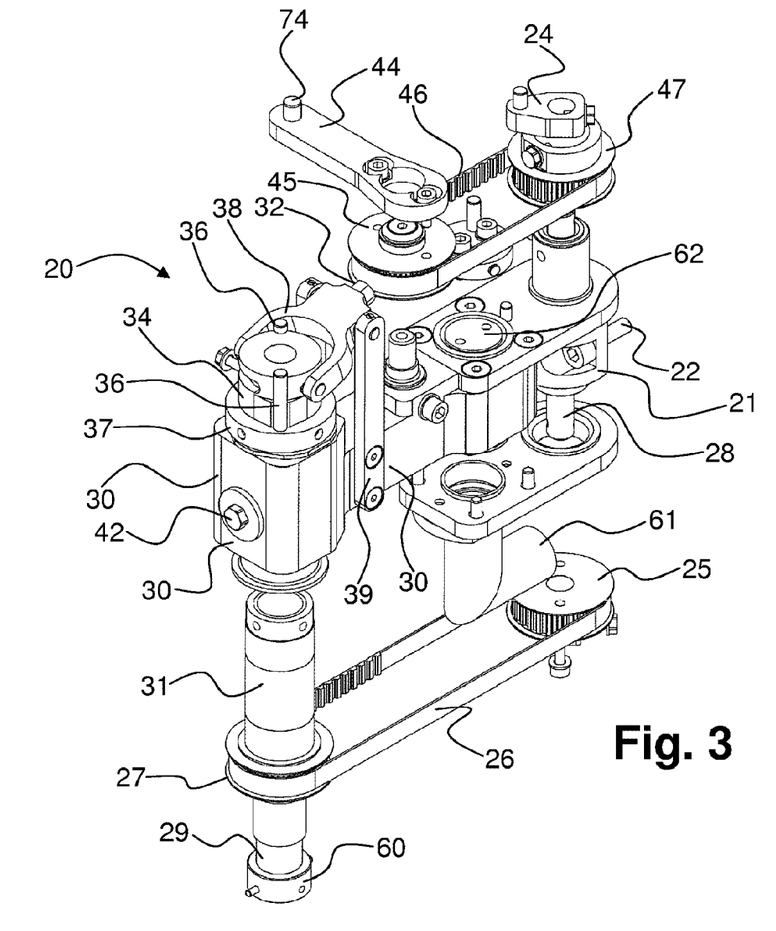
FIG. 3 shows an exploded view of an arm in FIG. 1.
Figure 4:
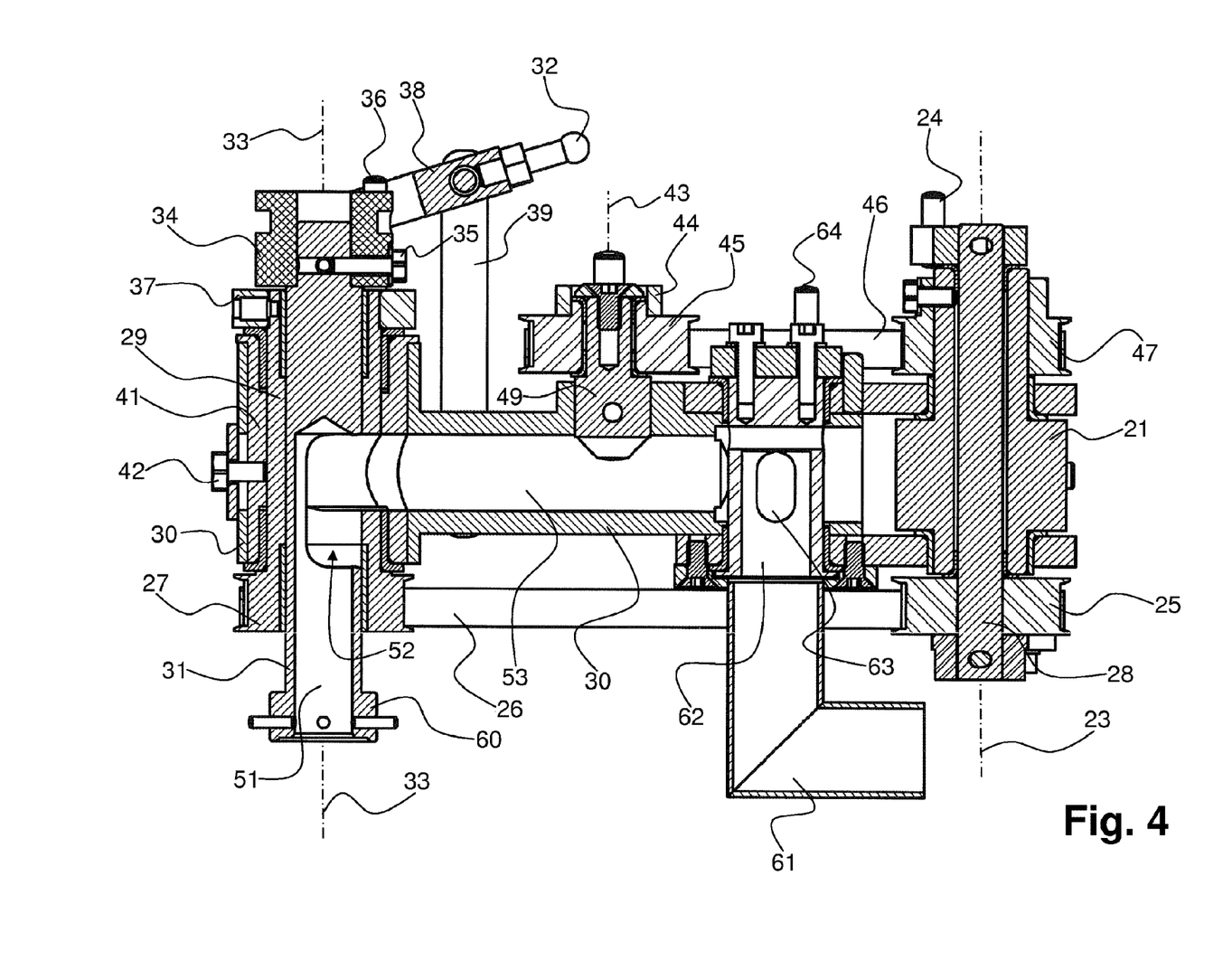
FIG. 4 shows a cross-sectional view of an arm of the transfer device in FIG. 1.

The illustration presented in FIG. 3 shows fastening sleeve 21 of arm 20 with one—in this case—of two fastening screws 22, with which fastening sleeve 21 is attachable to central wheel 11. Fastening sleeve 21 coaxially encloses an inner axis 23. An inner shaft 28 is also located around this inner axis 23, which is close to the wheel. Inner shaft 28 is connected as one piece with a lever 24, which is controlled by a cam. In this case, "inner" means that axis 23 is located close to wheel 11.

A first toothed ring 25 is fastened to inner shaft 28. A rotary motion of lever 24 is therefore transferred via first toothed ring 25 to first, internally toothed drive belt 26, which drives a second toothed ring 27. Toothed rings 25 and 27 have the same diameter. A rotational motion of lever 24 about a certain angle therefore results in an identical rotation of outer shaft 29. Outer shaft 29, which is located coaxially around outer axis 33, is supported in a rod-shaped arm sleeve 30, which extends essentially horizontally and transversely to first and second axes 23 and 33.

Outer shaft 29 or outer axis 33 are located far from the wheel, that is, they are located on the side of the hub of wheel 11 opposite to inner axis 23. Outer shaft 29 and second toothed ring 27 may be designed as one piece, or they may be composed of two separate yet interconnected elements. Elements 25, 26, and 27 represent a first transfer element.

An inner lift shaft 31 is guided in outer shaft 29. Due to the passage 53 described below, the arm sleeve or connecting body 30 is a sleeve, although it may also be a connecting body made of essentially solid material. Lift shaft 31 is fixedly connected with an articulated carrier 34 via a fixing screw 35. Two diametrically opposed pins 36, which are positioned vertically with a minimum of play, are provided in articulated carrier 34. Pins 36 are inserted in upper flange 37 of outer shaft 29, and they are preferably secured in a press fit or with screws.

As a result of this connection, the rotation of outer shaft 29 is transferred directly to lift shaft 31. Lift shaft 31 is simultaneously positioned such that it may be moved up and so down along outer rotation axis 33 given that a non-rotatable form-fit connection is provided between lift shaft 31 and outer shaft 29 in one region.

This translational reciprocating motion is brought about via articulated carrier 34, to which a forked pivoting lever 38 is hingedly connected. Pivoting lever 38 is attached to connecting body 30 with segments 39, on both sides in this case. An actuating lever 32 extends past pivoting lever 38 along the rigid transverse axis defined by segments 39, thereby enabling actuating lever 32 to perform the reciprocating motion.

By way of brief reference to FIG. 2, it is shown that the two outermost shafts 29 (at the far left and right) are located at the bottom, as shown in FIG. 3, and therefore rest on flange 37. The two outer shafts 29 shown in the middle are raised, however, i.e., article 15, which is being held with suction, is located in a much higher position than the other (outer) articles 15. An eccentric bush 41 with an adjustment screw 42 tightens first belt 26 by exerting pressure on connecting body 30.

A central shaft 49 is mounted on arm sleeve 30 in the center. A third toothed ring 45 is mounted on central shaft 49, in a central position. Third toothed ring 45 is rotatable around central shaft 49 and, therefore, central axis 43.

In this context, "central" refers to a location between axes 23 and 33 on the free ends of connecting body 30. The location of third axis 43 between first and second axes 23 and 33 does not necessarily mean a location on the direct line between axes 23 and 33, but rather a third axis 43, which may not be stationary, and which is located essentially in the region between axes 23 and 33.

Third toothed ring 45 is connected via a second belt 46 with a fourth toothed ring 47, which is located coaxially around inner axis 23. Third toothed ring 45 may be rotated using a lever 44, which is controllable using a face cam. Since third toothed ring 45 is located on arm sleeve 30 at a fixed distance from inner axis 23 in such a manner that it is rotatable around its main axis, but fourth toothed ring 47 is fixedly connected with fastening sleeve 21 and not with arm sleeve 30, when lever 44 rotates, this induces a direct pivoting motion of arm sleeve 30 and, therefore, entire arm 20 around the attachment point on central wheel 11. Elements 45, 46 and 47 represent a second transfer element.

Lift shaft 31 is hollow in its lower to central part. It includes a cavity 51, which is open at the bottom and is enclosed coaxially by a jacket. A flange 60 is provided on the lower section of lift shaft 31, on which a suction device or a gripper may be located, in a known manner. For simplicity, gripping device 60 will be discussed here. Reference is is made to FIG. 2, where a suction device 70 is located on flange 60.

The jacket of lift shaft 31 is also open on the side in the central part of lift shaft 31. Cavity 51 is therefore open on the side, as indicated with reference numeral 52. Cavity 51 is therefore in direct contact with passage 53, which is positioned horizontally and is enclosed in arm sleeve 30. Passage 53 transitions into tube connection 61, which, in this case, is guided in the shape of an "L" to a not-shown vacuum pump or related connections.

The transition between passage 53 and tube connection 61 is created by vacuum control sleeve 62, which includes a jacket that is open at the bottom but is closed everywhere else, and which includes at least one vacuum control opening 63. Vacuum control sleeve 62 is rotatably supported in arm sleeve 30 and may be rotated upwardly via an actuating bolt 64. Vacuum control sleeve 62 is closed in the position shown in FIG. 4.

Instead of the devices shown here for controlling a suction device 70, and instead of a preferred suction device 70, it is also possible to provide another known type of gripping device.

In summary, the following motions may be carried out by each arm 20 of a transfer device 10: When lever 24 on inner axis 23 is driven, this ultimately results in a rotational motion of flange 60 with gripping device or suction device 70. In contrast, when lever 44 is pivoted—since the four toothed rings 25, 27 and 45, 47 all have the same diameter—the arm sleeve rotates back around the same angle, thereby making it possible to easily adjust the orientation of outer axis 33 and, therefore, suction device 70 (viewed at the position of flange 60) in three dimensions relative to the axis of wheel 11. Articles 15 to be picked up may therefore be tracked very easily.

Figure 5:
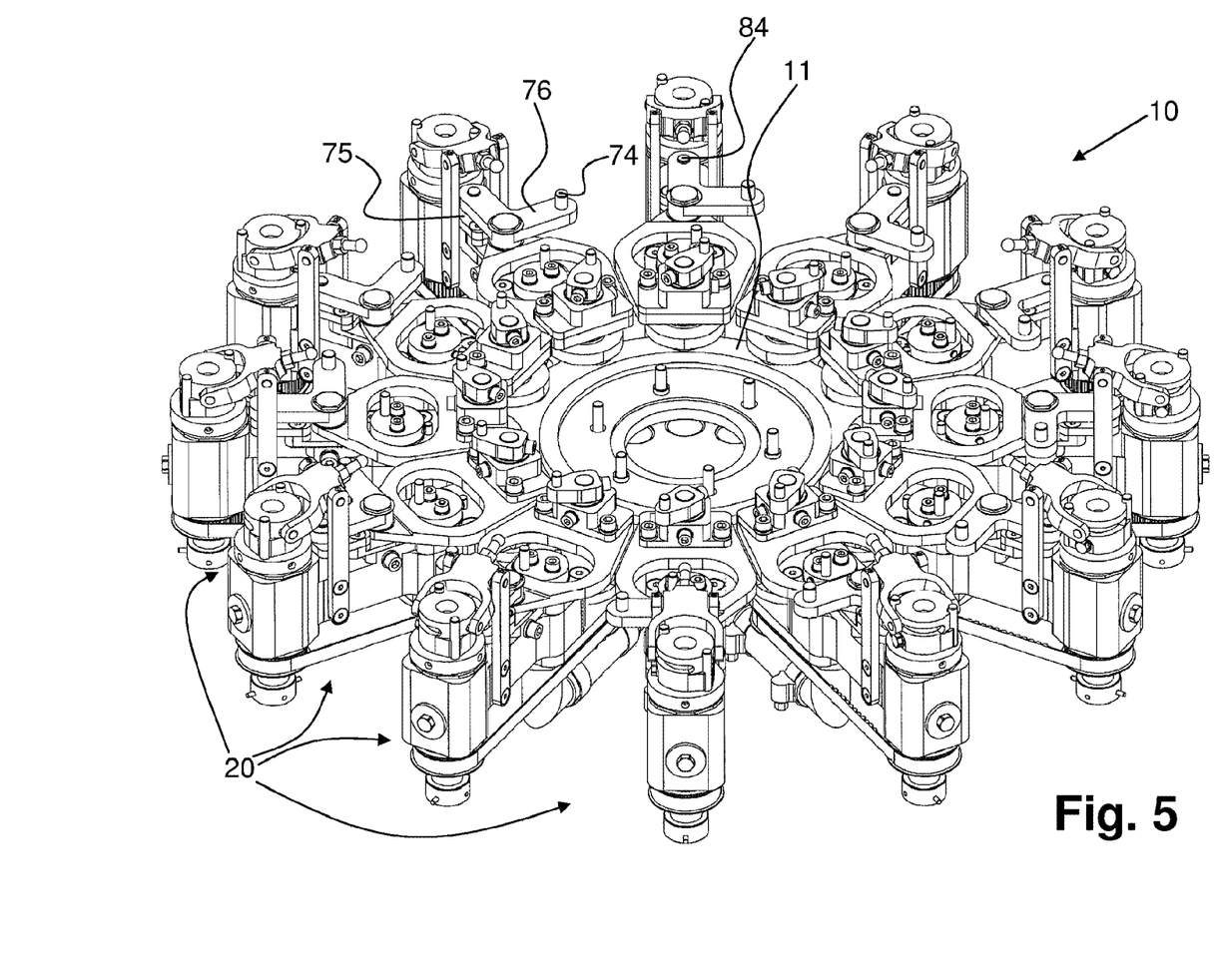
FIG. 5 shows a perspective view of the transfer device with twelve arms is according to a second exemplary embodiment of the present invention.

FIG. 5 shows a perspective view of transfer device 10 with twelve arms 20 according to a second exemplary embodiment of the present invention. Twelve arms 20 are movable in their horizontal plane, and they are hingedly connected to central wheel 11. Wheel 11 is rotatable around its axis, which is vertical in this case. One difference between the two exemplary embodiments described here is central axis 43, which, in this case, is not fixed relative to arm sleeve 30. In addition, control is not carried out via a knee joint 76, on which a fastening bolt 74 is located off-center relative to arm sleeve, while the center of the arm—which has the same length in this case—of knee joint 76 is connected with actuating lever 80 via a bolt 77. Elements 76, 77, and 80 represent a second transfer element, according to the second exemplary embodiment.

Figure 6:
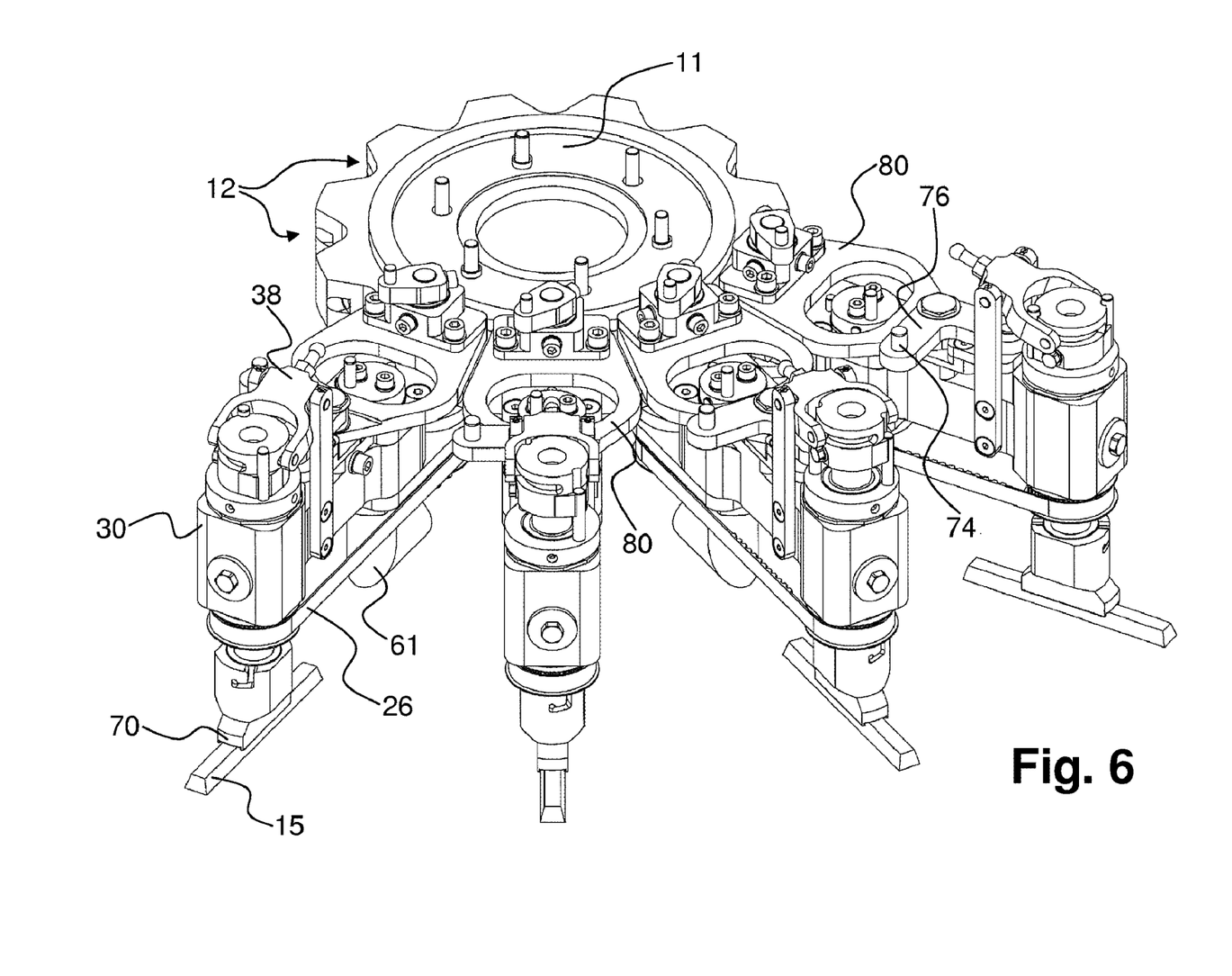
FIG. 6 shows a perspective view of the transfer device in FIG. 5, in an enlarged view, which shows the four arms in greater detail.
Figure 7:
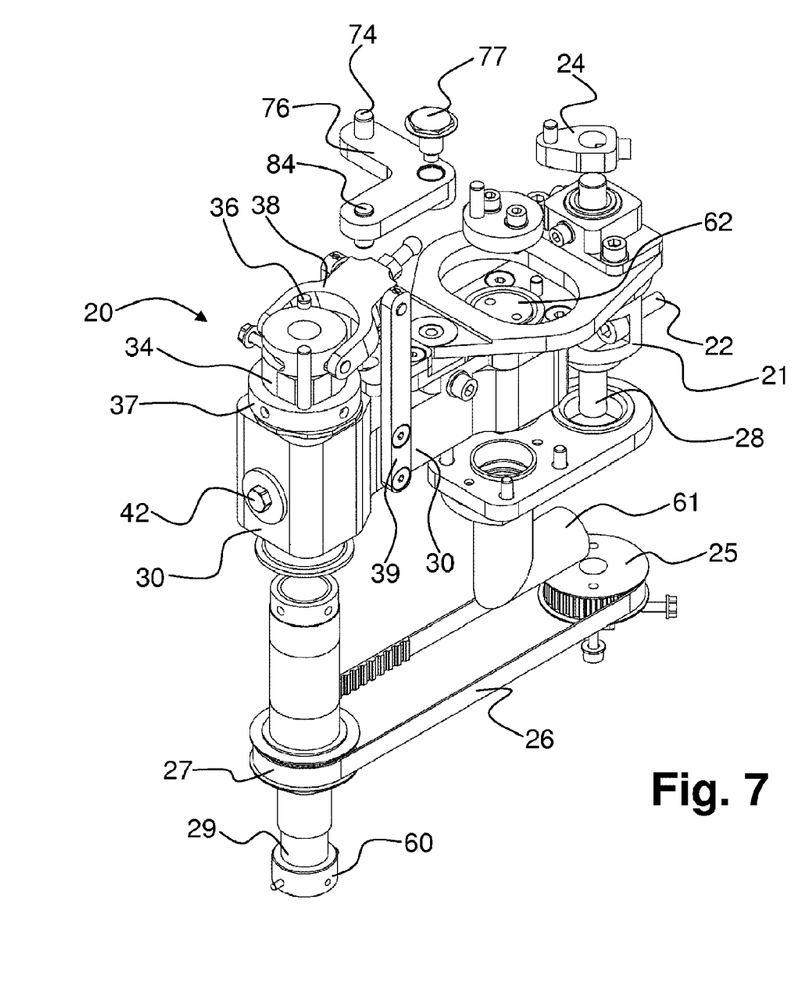
FIG. 7 shows an exploded view of an arm in FIG. 5.
Figure 8:
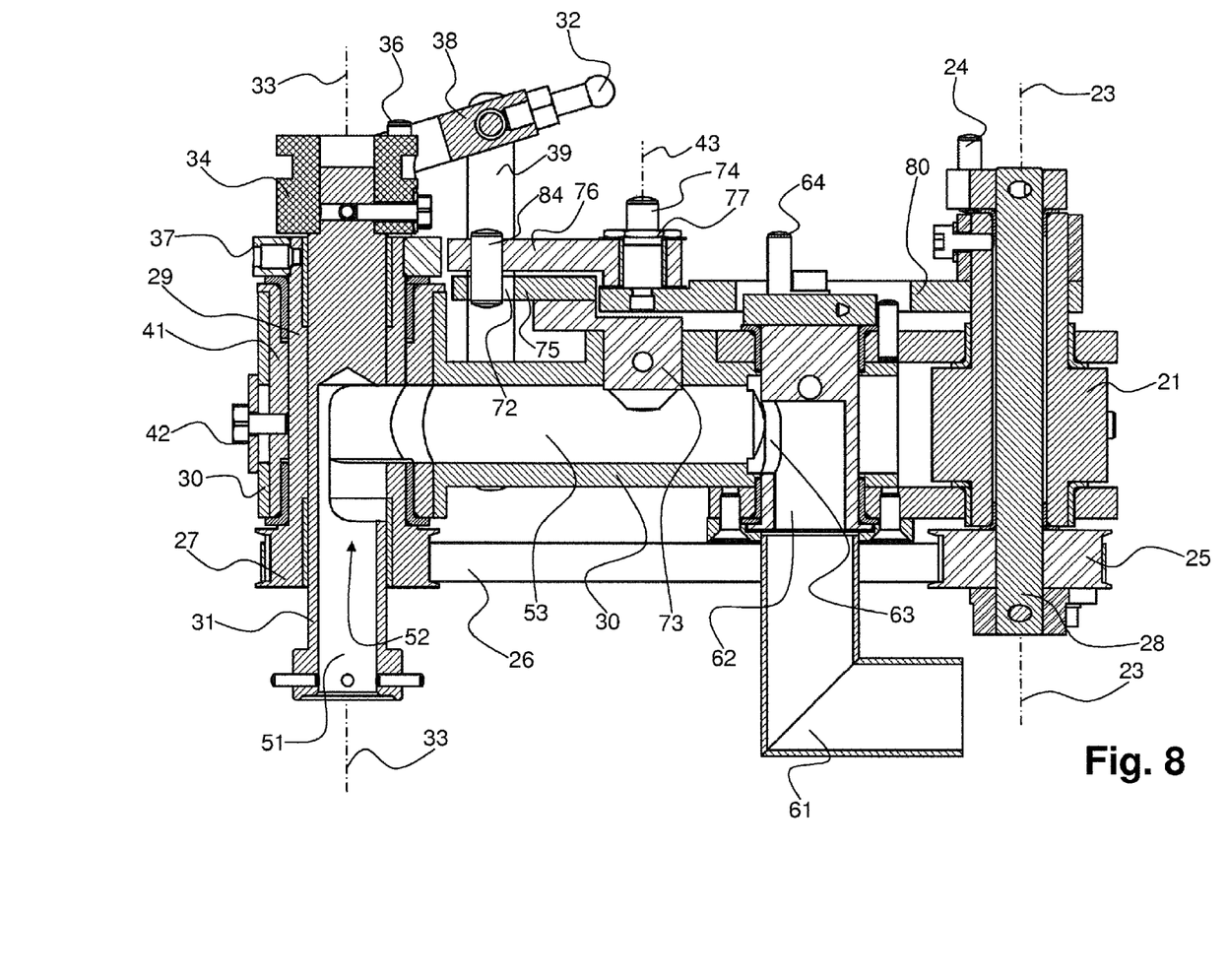
FIG. 8 shows a cross-sectional view of an arm of the transfer device in FIG. 5.

Further details of arms 20 are described in conjunction with FIGS. 6 through 8. The same reference numerals are used in both exemplary embodiments to describe identical components, even through the specific features of the components may differ.

FIG. 6 shows a perspective view of transfer device 10 in FIG. 5, in an enlarged view, and with the four arms 20 shown in greater detail. In particular, transfer levers 80 are shown on each arm 20; this is an essential difference between the second exemplary embodiment and the first exemplary embodiment.

This is explained in greater detail with reference to FIGS. 7 and 8, which show, respectively, an exploded view and a cross-sectional view of a single arm 20 according to FIG. 5.

The illustration presented in FIG. 7 shows fastening sleeve 21 of arm 20 with one—in this case—of two fastening screws 22, with which fastening sleeve 21 is attachable to central wheel 11. A motion of first toothed ring 25 is transferred to a second toothed ring 27 in the same manner as described in the first exemplary embodiment. This also applies for the connection with the arm sleeve or connecting body 30 on outer axis 33. The translational reciprocating motion described above is also brought about, in this case, via articulated carrier 34, to which a forked pivoting lever 38 is hingedly connected. Pivoting lever 38 is attached to connecting body 30 with segments 39.

A holding insert 73 is non-rotatably inserted in an opening in fastening sleeve 30. Holding insert 73 is fixedly connected with an arm 75 oriented in the direction of outer axis 33. Holding insert 73 and arm 75 may also be designed as one piece, of course. A slot 72 oriented between two axes 23 and 33 is provided in arm 75. A pin 84 is inserted and guided in slot 72, and it engages in an arm of knee joint 76, which therefore may pivot. Slot 72 could also be integrated in fastening sleeve 30, or it could be realized in an overhanging projection at this point.

Knee joint 76 is connected with transfer lever 80 via a bolt 77. Transfer lever 80 is therefore rotatable using an actuating bolt 74, which is provided on the other arm end of knee joint 76 and is controllable via a face cam. Since actuating bolt 74 is located such that it may pivot relative to arm sleeve 30 using the coupling via arm 75 and knee joint 76, but transfer lever 80 is fixedly connected with fastening sleeve 21 in the region of axis 23, when actuating bolt 74 rotates, the direct result is that arm sleeve 30 and, therefore, entire arm 20, pivot. Third central axis 43 is therefore realized at the point where bolt 77 is located. In contrast to the first exemplary embodiment, this bolt is not stationary. Instead, it changes its position when lever 80 pivots and, in fact, in accordance with its angular position.

Lift shaft 31 is hollow in its lower to central part. It is therefore designed the same as in the first exemplary embodiment, up to tube connection 61. In this case, vacuum control sleeve 62 is opened with its vacuum control opening 63 in the position shown in FIG. 8. Actuating bolt 64 extends through an opening in transfer lever 80, to be gripped from above.

In summary, the following motions may be carried out by each arm 20 of a transfer device 10 as shown in FIGS. 5 through 8: When lever 24 on inner axis 23 is driven, this ultimately results in a rotational motion of flange 60 with gripping device or suction device 70. In contrast, when bolt 74 is pivoted, arm sleeve 30 rotates forward and backward around an angle, thereby making it possible to easily adjust the orientation of outer axis 33 and, therefore, suction device (viewed at the position of flange 60) in three dimensions relative to the axis of wheel 11. Articles 15 to be picked up may therefore be tracked very easily.

As essential feature of all exemplary embodiments, which one skilled in the art may expand upon based on the present invention, is that a wheel 11 with a large number (twelve, in this case) arms 20 may quickly reorient longitudinal articles that are conveyed at a high rate of speed, thereby enabling them to be conveyed with a relatively much higher rate of speed. There do not necessarily have to be twelve arms, of course. A different number of arms, e.g., eight arms 20 or sixteen arms 20 may also be used.

As evidenced by the descriptions above, the device is independent of the further means used in the packaging system. This applies to the type of supply conveyor belt and the actual picking device or the downstream conveyor belt.

Instead of toothed rings 25, 27, 45 and 47, it is also possible to use deflection rollers, with which belts 26, 46 must be under tension in order to be driven. Instead of belts 26, 46, it is also possible to use chains or other driving elements with a form-fit or non-positive connection.

REFERENCE NUMERALS

10 Transfer device
11 Central wheel
12 Receptacle for an arm
15 Longitudinal article
20 Arm
21 Fastening sleeve
22 Fastening screw
23 Inner axis
24 Lever
25 First toothed ring
26 First drive belt
27 Second toothed ring
28 Inner shaft
29 Outer shaft
30 Arm sleeve, connecting body
31 Lift shaft
32 Actuating lever
33 Outer axis
34 Articulated carrier
35 Fixing screw
36 Pin
37 Flange
38 Pivoting lever
39 Segment
41 Eccentric bush
42 Adjustment screw
43 Central axis
44 Lever
45 Third toothed ring
46 Second belt
47 Fourth toothed ring 49 Central shaft
51 Cavity
52 Side opening
53 Passage
60 Flange
61 Tube connection
62 Vacuum control sleeve
63 Vacuum control opening
64 Actuating bolt
70 Suction device
72 Slot
73 Holding insert
74 Actuating bolt
75 Arm
76 Knee joint
77 Bolt
80 Transfer lever
84 Pin

What is claimed is:

1. A transfer device (10) for gripping articles (15) from a first feed conveyor, which points in a first direction, and for subsequently placing the articles (15) on a second, removing conveyor that points in a second direction and is composed of a central wheel body (11), which rotates in a plane of rotation, on the periphery (12) of which a large number of arms (20) is hingedly connected such that the arms (20) are capable of being swiveled (21) around a first axis (23), which is perpendicular to the plane of rotation, each of the arms (20) including at least one gripping device (60, 70), with which at least one article (15) may be received; each arm (20) also has a second axis (33), which is parallel to the first axis, with a sleeve (31) on which the gripping device (60, 70) is mounted being located on the second axis (33), the sleeve (31) being rotatable for a specified orientation of the articles (15), wherein
each movable arm (20) is designed as a connecting body (30), which is rotatable about the first axis (23); the rotational motion of the gripper device (60, 70) is transferrable from a shaft (28) located in the first (23) with the aid of a transfer element (25, 26, 27) to a sleeve (31), which rotates around a second axis (33) between the first and second axes (23, 33); and a controlled rotational motion of the connecting body (30) is transferrable via a shaft (49, 77) located in the third axis (43) with the aid of a second transfer element (45, 46, 47; 76, 77, 80) to an element (21; 47, 80) that is attachable to the central wheel body (11) and is positioned such that it may rotate coaxially around the first axis (23).

2. The device as recited in claim 1, wherein the wheel body (11) is driveable with a constant rotational speed.

3. The device as recited in claim 1, wherein the gripping device (60, 70) is displaceable on the second axis (33) in a translatory manner along the second axis (33), the gripping device (60) being connected with the second axis (33) in a non-positive or form-fit manner.

4. The device as recited in claim 3, wherein the gripping device (60, 70) is movable in a translatory manner using a lever (32) controlled via a pivoted link guide.

5. The device as recited in claim 1, wherein the gripping device (60, 70) is a suction device (70).

6. The device as recited in claim 5, wherein the connecting body (30) includes a cavity (53), and the gripping device (60) is a sleeve (31) that is connected with the cavity (53), thereby making it possible to connect an element (61) close to the wheel with the suction device in order to create a vacuum.

7. The device as recited in claim 6, wherein a valve (62) is provided at the transition from the cavity (53) in the connecting body (30) to the element (61) close to the wheel; the valve (62) may be switched by an actuating element (64) provided on the connecting body (30).

8. The device as recited in claim 1, wherein the third axis (43) is located between the first (23) and second (33) axis, in a position between ⅓ and ⅔ the distance between the two, and preferably in the center.

9. The device as recited in claim 1, wherein the third axis (43) is rotatable using a lever (44) controlled via a face cam.

10. The device as recited in claim 1, wherein the position of the third axis (43) is changeable depending on the rotation of the element (21; 47, 80).

11. The device as recited in claim 1, wherein the transfer elements (25, 26, 27 and 45, 46, 47) are deflection rollers or toothed rings, which are interconnected via drive belts or toothed belts.

12. The device as recited in claim 11, wherein the deflection rollers or toothed rings are designed to be identical to each other.

13. The device as recited in claim 11, wherein the belt tension of the first transfer element (25, 26, 27) is adjustable using an eccentric bush (41, 42) located on the second axis (33).

14. The device as recited in claim 1, wherein the conveyors are conveyor belts or conveyor chains with drivers located at intervals thereon.

15. The device as recited in claim 1, wherein the supply conveyor and the removing conveyor form an angle of 90 degrees.

16. The device as recited in claim 1, wherein the positive control of the first transfer element (25, 26, 27) via a lever (24) is designed to maintain the orientation of the longitudinal articles while they are being transferred from the supply conveyor to the removing conveyor.

17. The device as recited in claim 1, wherein the positive control of the second transfer element (45, 46, 47; 76, 77, 80) via a lever (76) is designed to maintain the orientation of the longitudinal articles while they are being transferred from the supply conveyor to the removing conveyor.

* * * * *